(12) United States Patent
Esaki et al.

(10) Patent No.: US 6,188,493 B1
(45) Date of Patent: Feb. 13, 2001

(54) ELECTRONIC BLACKBOARD DEVICE

(75) Inventors: Takahiro Esaki, Fukuoka; Kazuhiro Eguchi, Kasuga; Takeshi Nakayama, Fukuoka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/058,242

(22) Filed: Apr. 10, 1998

(30) Foreign Application Priority Data

Apr. 18, 1997 (JP) ................................................ 9-101404
Aug. 7, 1997 (JP) ................................................ 9-212818
Aug. 29, 1997 (JP) ................................................ 9-234325

(51) Int. Cl.⁷ ............................................ H04N 1/46
(52) U.S. Cl. .......................... 358/505; 358/501; 358/1.9
(58) Field of Search ................................ 358/505, 471, 358/500, 474, 501; 178/19.01; 382/312

(56) References Cited

U.S. PATENT DOCUMENTS

| | | | | |
|---|---|---|---|---|
| 4,713,698 | * | 12/1987 | Takahashi et al. ............. | 358/296 |
| 4,755,882 | * | 7/1988 | Toyota ............................ | 358/293 |
| 4,963,895 | * | 10/1990 | Harada et al. .................. | 346/108 |
| 5,023,408 | * | 6/1991 | Murakami et al. .............. | 178/19 |
| 5,164,837 | * | 11/1992 | Hirosawa ........................ | 358/296 |
| 5,181,129 | * | 1/1993 | Sato et al. ...................... | 358/494 |
| 5,231,418 | * | 7/1993 | Inui et al. ....................... | 346/1.1 |
| 5,959,740 | * | 9/1999 | Takeda et al. .................. | 358/296 |

FOREIGN PATENT DOCUMENTS 62-56000    11/1987   (JP) .

\* cited by examiner

Primary Examiner—Cheukfan Lee
(74) Attorney, Agent, or Firm—Stevens, Davis, Miller & Mosher, L.L.P.

(57) ABSTRACT

An electronic blackboard device capable of performing color printing. Data read by an image sensor is converted to digital data by an A/D converter and provided via a shading correcting circuit and a converter to a printer control circuit, which causes a color printer to print the appropriate data in a color corresponding to a marker.

9 Claims, 6 Drawing Sheets

ELECTRONIC BLACKBOARD DEVICE

BACKGROUND OF THE INVENTION

1. Field of the Invention

The present invention relates to electronic blackboard devices capable of reading information written on a writing surface and printing the information on recording paper, and more particularly to an electronic blackboard device capable of reading and printing a plurality of colors.

2. Description of the Related Art

Conventionally, an electronic blackboard such as disclosed in JP-B-62-56000 is widely used in a meeting room of a private enterprise. In this case, the data recorded on the writing surface in a meeting can be printed as it is on general or heat-sensitive paper and it is unnecessary to take the trouble to write the data on a notebook. Data is written erasably with an aqueous marker on the writing surface of the blackboard, so that the data recorded on the writing surface is erasable with an eraser after use and the same writing surface is usable as a new writing surface. Not only the information written with the marker but also a chart pasted on the writing surface is readable.

However, the conventional electronic blackboard can read/print only in a monochromatic manner, so that information written with a red or blue marker other than a black one would be printed in black. Even when a chart using a plurality of different colors may be read, the chart would be printed only in a monochromatic manner. Thus, there is a strong demand for an electronic blackboard device capable of handling color printing.

The conventional color printing is usually performed in gradations and all toners of cyan (C), magenta (M), yellow (Y), and black (K or Bk) are mixed to form any particular color. Thus, even when data is written, for example, with a red monochromatic marker on the writing surface, there is a waste that all the C, M, Y and K toners are used to print the data.

Conventionally, data is written with a monochromatic marker on the writing surface of the blackboard or a photograph or a printed chart is pasted on the writing surface. In the latter case, the read chart is often printed in a high gradation/multi-color manner whereas in the former case, although data written with the marker can frequently and sufficiently be printed in a non-gradation/ monochromatic manner as mentioned above, there is a waste that all the C, M, Y and K toners are always used to print the data without discriminating the chart printing from the marker description/printing or vice versa.

Conventionally, there can be two areas concurrently on the same writing surface of the electronic blackboard, one in which data is written with a monochromatic marker and the other on which a photograph or a printed chart is pasted. In this case, the chart is read and printed often in a high gradation/multi-color manner whereas although the data written with the marker is printed often and sufficiently in a non-gradation and monochromatic manner, there is the waste that the C, M, Y and K toners are always used without discriminating the marker writing/ printing from the chart printing or vice versa.

SUMMARY OF THE INVENTION

According to one aspect of the present invention, an electronic blackboard device comprises a writing surface on which information is to be written erasably with writing materials, a reader for reading the information written on the writing surface for each of color components of the information, and printing means for outputting the information read by the reader in predetermined colors onto a recording paper.

In the above arrangement, an image written with a marker or another writing means is printed in a reduced number of different color forming materials (coloring agents) such as toners or inks (hereinafter, represented by toners), so that wasteful use of the toners is avoided.

According to another aspect of the present invention, an electronic blackboard device comprises a writing surface on which information is to be written erasably with writing materials, a reader for reading the information written on the writing surface for each of color components of the information, and printing means for outputting the information read by the reader onto a recording paper, the printing means selecting one of a first mode in which the information is output by using less than three coloring agents for one pixel and a second mode in which the information is output in multi-gradations.

By the above arrangement, the printing mode is changed depending on a type of an image on the writing surface to thereby reduce wasteful use of the toners.

According to a further another aspect of the present invention, an electronic blackboard device comprises a writing surface on which information is to be written erasably with writing materials, a reader for reading the information written on the writing surface for each of color components of the information, and printing means for outputting the information read by the reader onto a recording paper, and print control means for performing first processing on the information read by the reader in a first area of the writing surface and providing the resulting information to the printing means, and for performing second processing on the information read by the reader in a second area of the writing surface and providing the resulting signal to said printing means.

By such arrangement, the printing processing is changed depending on the type of an image area on the writing surface to reduce wasteful use of the toners.

DESCRIPTION OF THE PREFERRED EMBODIMENTS

Embodiments of the present invention will be described next.

Figure 1:
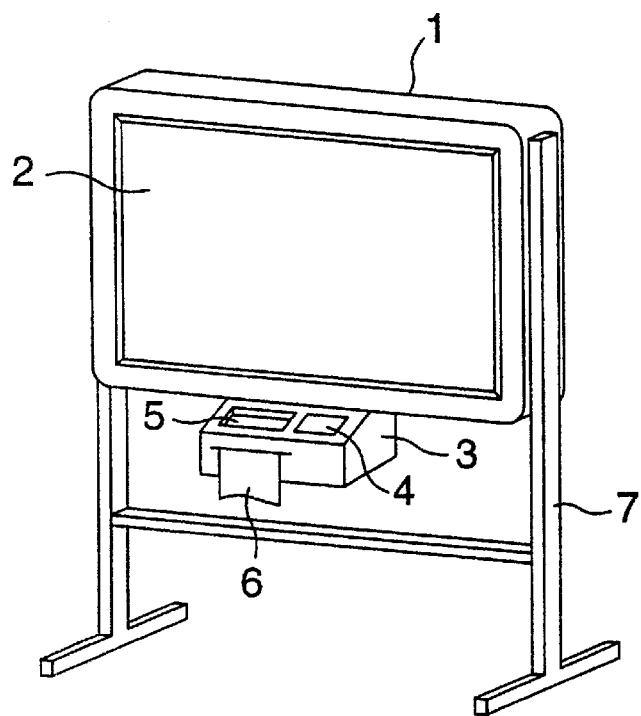
FIG. 1 is a perspective view of an electronic blackboard device as one embodiment of the present invention.

FIG. 1 is a perspective view of the electronic blackboard device as one embodiment of the present invention. Reference numeral 1 denotes a housing of the blackboard device; 2 a writing sheet revealed in an opening in the housing 1 on which writing sheet information will be written erasably with an aqueous marker or other writing materials; 3 a printer device attached below the housing 1 and including a color printer unit (described later) and a control unit; 4 a control panel provided on the printer device 3; 5 a case provided above the printer device 3 for receiving a marker and/or eraser; and 6 recording paper on which information is printed with the printer device 3.

Figure 2:
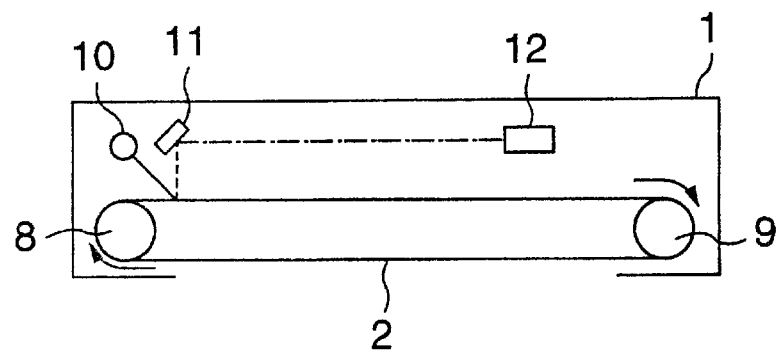
FIG. 2 illustrates a composition of the electronic blackboard.

FIG. 2 shows the composition of the electronic blackboard device. Reference numerals 8 and 9 denote rollers driven by a motor (not shown) to move the writing sheet 2; 10 a light source for irradiating the writing sheet 2 with light; 11 a reflective mirror which reflects a reflection of the light irradiated by the light source 10 from the writing sheet 2; 12 a color CCD image sensor which receives light from the reflective mirror 11 and converts the light to trichromatic RGB electric signals where R, G and B denote red, green and blue, respectively.

As the writing sheet 2 is carried by the rollers 8 and 9, the information written on the writing surface of the writing sheet 2 is read out by the image sensor 12 with the aid of the light source 10 and the reflective mirror 11. The read information is converted to trichromatic RGB signals, which are then output.

Figure 3:
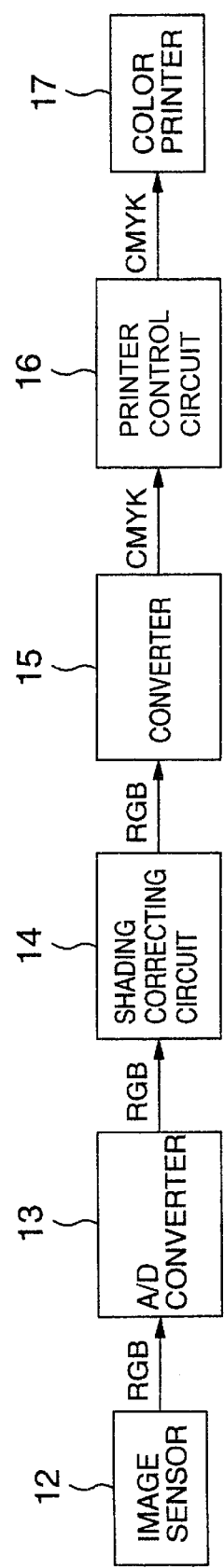
FIG. 3 is a block diagram of the blackboard device.

FIG. 3 is a block diagram of the electronic blackboard device of the embodiment. In FIG. 3, reference numeral 12 denotes the image sensor; 13 an A/D converter which converts the analog RGB signals output from the image sensor 12 to 8-bit RGB digital signals; 14 a shading correcting circuit which corrects the RGB signals from the A/D converter 13 equally for each pixel on the basis of the output RGB signals and outputs the resulting RGB signals; 15 a converter which converts the trichromatic RGB signals output from the shading correcting circuit 14 to CMYK signals; and 16 a printer control circuit which causes a color printer 17 to print in an ink jet system on the basis of the CMYK outputs from the converter 15. The color printer 17 records "0" or "1" for each of the CMYK colors and performs color printing in a total of 8 colors, using a combination of four colors C, M, Y and K.

Thus, when the output signals (C, M, Y, K) are, for example, (0, 0, 0, 1), the corresponding data is printed in black. When the output signals are (0, 1, 1, 0), the corresponding data is printed in red. When the output signals are (1, 0, 1, 0), the corresponding data is printed in green. When the output signals are (1, 1, 0, 0), the corresponding data is printed in blue.

In operation, the writing sheet 2 on which information is written, for example, with a marker, is conveyed by rotation of the rollers 8 and 9. In that case, light is irradiated ono the writing sheet 2 with the light source 10 and its reflection enters the image sensor 12 via the reflective mirror 11. The light entering the image sensor 12 is dissolved into trichromatic RGB signals, which are then converted by A/D converter 13 to the corresponding multi-level RGB digital data, which are then output to the shading correcting circuit 14. The shading correcting circuit 14 corrects an uneven light quantity of the light source 10, an uneven light sensitivity of the image sensor 12, and outputs resulting trichromatic RGB color signals for each pixel.

The converter 15 determines the color of each sensed pixel on the basis of the RGB output signals from the shading correcting circuit 14, and converts the RGB signals to CMYK signals, processable by the color printer, on the basis of the result of the color determination. The printer control circuit 16 causes the color printer 17 to print the pixel on the basis of the CMYK signals output by the converter 15.

Since the conventional color printing involves mixing all the CMYK toners to form any particular color, however, data is printed wastefully using unnecessary toners even when data is written on the writing surface, for example, with a red monochromatic marker.

In order to avoid such undesirable processing, the present inventive method involves examining the respective signal levels of the read pixel. If all the RGB levels of the read pixel are not less than a predetermined value (for example, of 200 in 256 gradations), the read pixel is regarded as a white one and the data is printed in white. Likewise, if all the RGB signal levels are not larger than a predetermined value (for example, of 50), the data is regarded as a black one and printed in black.

If at least one of the RGB signal levels does not satisfy the above condition, for example, if only the R signal is over the level of 200 and the G and B levels are below 200, the information is determined as written with a red or substantially red marker. Thus, a signal having the highest level value (in this case, R) is selected from among the RGB signals and only the M and C toners are selected from the CMYK toners and mixed and used to print the information in red.

For example, red and substantially red markers vary somewhat in color from one to another. In the invention, the color of any particular one of those markers is not reproduced faithfully by mixing the four different toners, but only the M toner or a mixture of two different toners (three different toners in a special case) is used to print information in red in order to avoid waste of the toners. This applies likewise to the cases of blue and substantially blue and green and substantially green markers.

Figure 4:
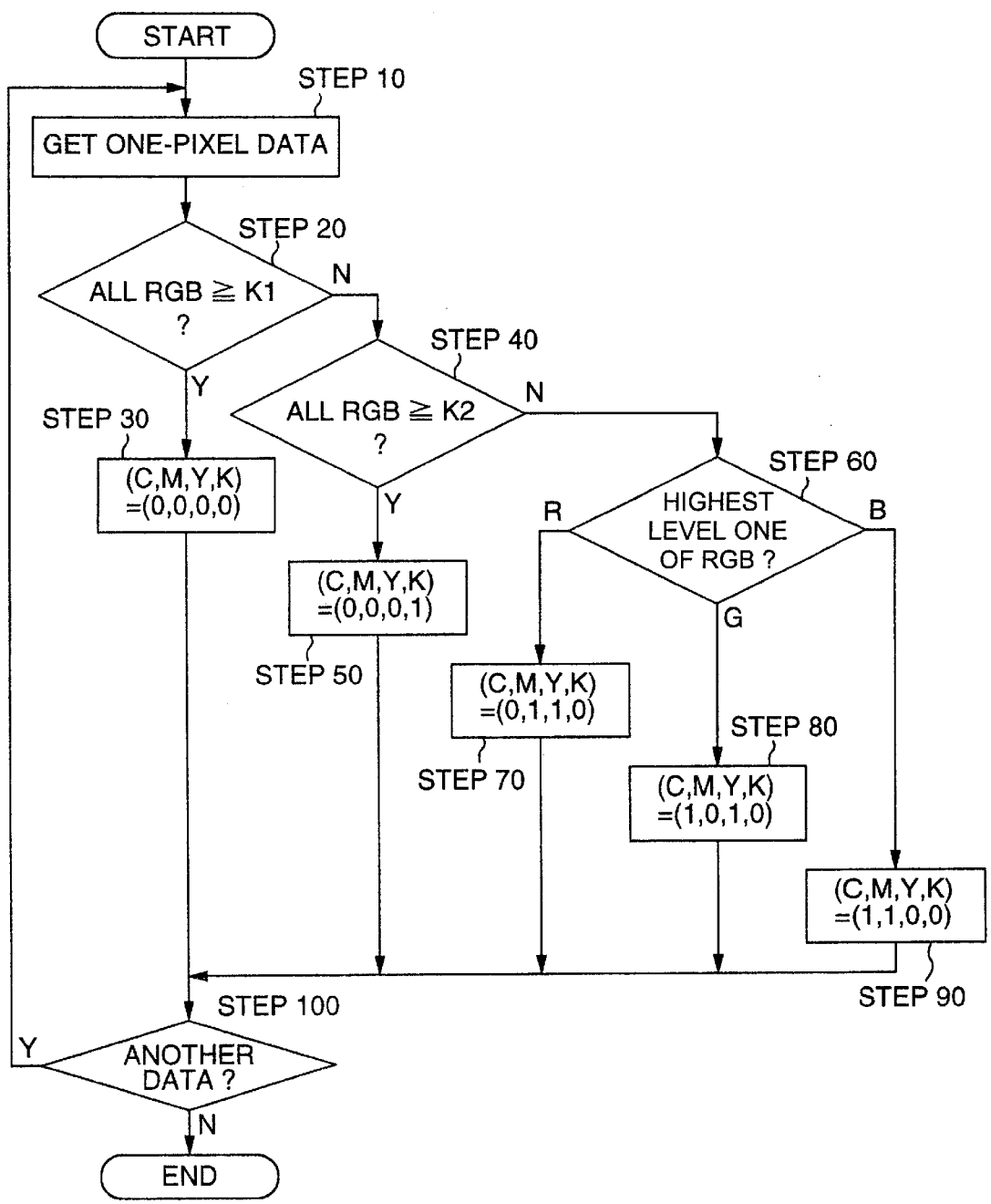
FIG. 4 is a flow chart of operation of the blackboard device.

Operation of the converter 15 will be described next with reference to a flow chart of FIG. 4. First, at step 10, the converter 15 gets data for one pixel output from the shading correcting circuit 14, and examines the levels of the respective R, G, B color signals. If the levels of all RGB signals are not less than a predetermined value k1 (for example, of 150, if each output signal from the shading correcting circuit 14 has an 8-bit/256 gradation), the converter 15 determines that the pixel is white and provides output signals (C, M, Y, K)=(0, 0, 0, 0) to the printer control circuit 16 (steps 20–30). If all the levels of the RGB color signals are not larger than a predetermined value k2 (for example, of 50, if each output signal from the shading correcting circuit 14 has an 8-bit/ 256 gradation), the converter determines that the pixel is black and provides output signals (C, M, Y, K)=(0, 0, 0, 1) to the printer control circuit 16 for printing the data in black (steps 40–50). If the pixel is neither white nor black, the converter determines at step 6 which of red, blue and green the pixel is. Specifically, the converter compares the levels of the respective RGB signals to detect the highest level signal (step 60). When the R signal has the highest level, the converter determines that pixel is red and provides output signals (C, M, Y, K)=(0, 1, 1, 0) to the printer control circuit 16 to print the pixel in red at step 70. When the G signal has the highest level, the converter determines that the pixel is green and provides output signals (C, M, Y, K)=(1, 0, 1, 0) to the printer control circuit 16 to print the pixel in green. When the B signal has the highest level, the converter determines that the pixel is blue and provides output signals (C, M, Y, K)=(1, 1, 0, 0) to the printer control circuit 16 to print the pixel in blue. The above processing is performed on all the pixels output from the shading correcting circuit 14.

As described above, in the present embodiment, color printing is performed by the electronic blackboard device. In addition, even when there is an uneven writing, it can be eliminated in a predetermined color corresponding to the marker. Even when there are uneven colors formed due to use of a marker, they are printed in a predetermined color, no excess toners are required to be used. For example, even when a Y (yellow) component is contained and read in data written with a blue marker, this component is neglected and the data is output in a mixture of C (cyan) and M (magenta) to correct unevenness in the printed color which would otherwise be produced by printing and prevent the toners from being wasted.

A second embodiment of the electronic blackboard device according to the present invention will be described next. The main feature of the second embodiment is that two modes are provided, one in which it is determined which of black, red and blue each of the pixels of a read image on the writing surface is and that pixel is printed in the color printer 25 in a monochromatic toner or ink closest in color to that pixel, or two different types of toners or ink, and the other in which the read image data is subjected to a gradation forming process and printed in a multi-color.

Figure 5:
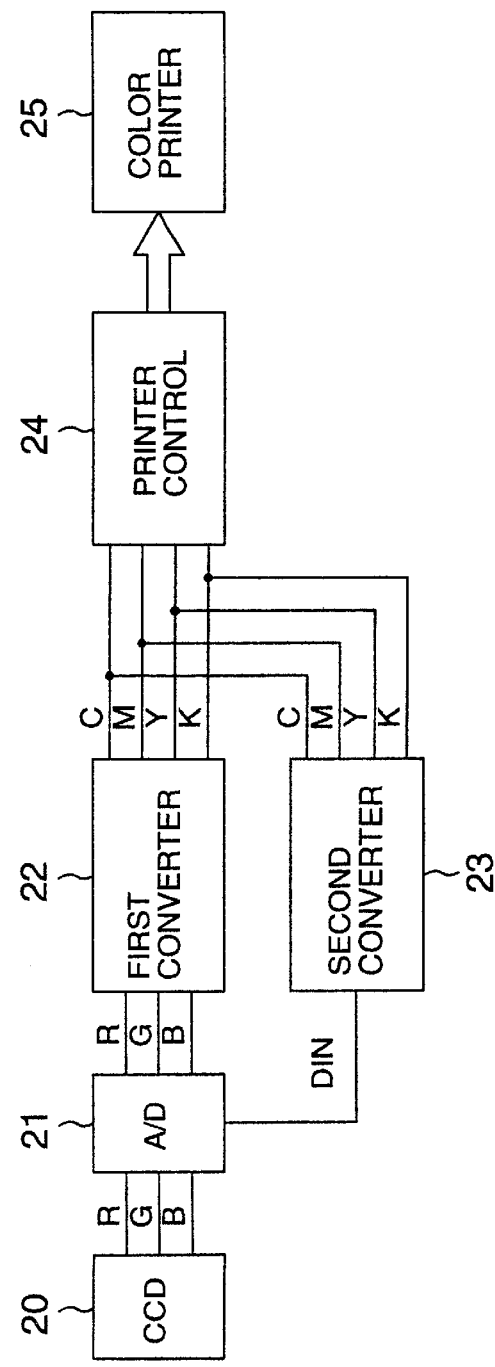
FIG. 5 is a block diagram of an electronic blackboard as a second embodiment of the present invention.

FIG. 5 is a block diagram of the electronic blackboard device of the second embodiment. In FIG. 5, reference numeral 20 denotes the image sensor; 21 an A/D converter which converts analog RGB signals output from the image sensor 20 to corresponding 8-bit RGB digital signals; 22 a first converter which converts the RGB signals output from the A/D converter 21 to CMYK signals; 23 a second converter which outputs CMYK signals based on a signal of a particular color (in this embodiment, B) output from the A/D converter 21; 24, a printer control unit which causes a color printer 25 (in this case, an ink jet printer) to print on the basis of the output from the first or second converter 22 or 23.

In operation, when data written on the writing sheet 2 is read and printed, one of a first and second mode is used, in the first mode data read in the trichromatic RGB colors is printed in corresponding gradationed colors, and in the second mode the data read in the trichromatic RGB colors is printed in corresponding non-gradationed colors. Before reading, one of the first and second modes is set by an input from the control panel 4 (FIG. 1). In the blackboard device, data is written usually with an aqueous marker of a predetermined color. In the case of this embodiment, data is written with black, red and blue markers.

However, when information written with those markers is read by the color image sensor, the respective colors contain more or less trichromatic RGB components. When the information as it is is converted to CMYK data, which is then printed by the color printer 25, all the kinds of inks are always consumed, which is very wasteful.

Thus, in the second mode, it is determined which of black, red and blue each of the pixels is and that pixel is printed in an ink closest in color to that pixel by the color printer 25.

In the case of the present embodiment, data written with a black marker is printed in a K ink. Data written with a red marker is printed in an M ink. Data written with a blue marker is printed in a C ink. No yellow marker is used, so that no Y ink is used.

In the first mode, the trichromatic RGB signals output from the image sensor 20 are converted by the A/D converter 21 to corresponding RGB 8-bit digital signals and provided for the first converter 22, which converts the trichromatic RGB signals to CMYK signals where C, M, Y and K are of 2 bits. Those signals are then output to the printer control unit 24 which causes the color printer 25 to print the pixel data involving those signals in 64 (4×4×4) colors.

In the second mode, the A/D converter 21 provides only the B component signal $D_{IN}$ of the trichromatic RGB data to the second converter 23, which examines the level of the B component signal for each pixel, regards the color of the pixel as an appropriate one of C, M, Y and K, and provides corresponding CMYK signals to the printer control unit 24. The second converter 23 has threshold values L1, L2 and L3 to determine which of black, red and blue the input data is. The second converter 23 compares the level of the input data with the threshold values L1, L2 and L3. If the input data is determined to be black as the result of the comparison, the data is printed in a K ink. If the input data is determined to be red, the data is printed in an M ink. If the input data is blue, the data is printed in a C ink. Those threshold values L1, L2 and L3 are numerical values obtained experimentally. Assume, for example, that an aqueous marker to be used is represented by 8-bit data (256 gradations/ "0"–"255"), black is about "30", red about "70", and blue about "120". Thus, L1, L2 and L3 may be set as "130", "80", and "40" respectively.

Figure 6:
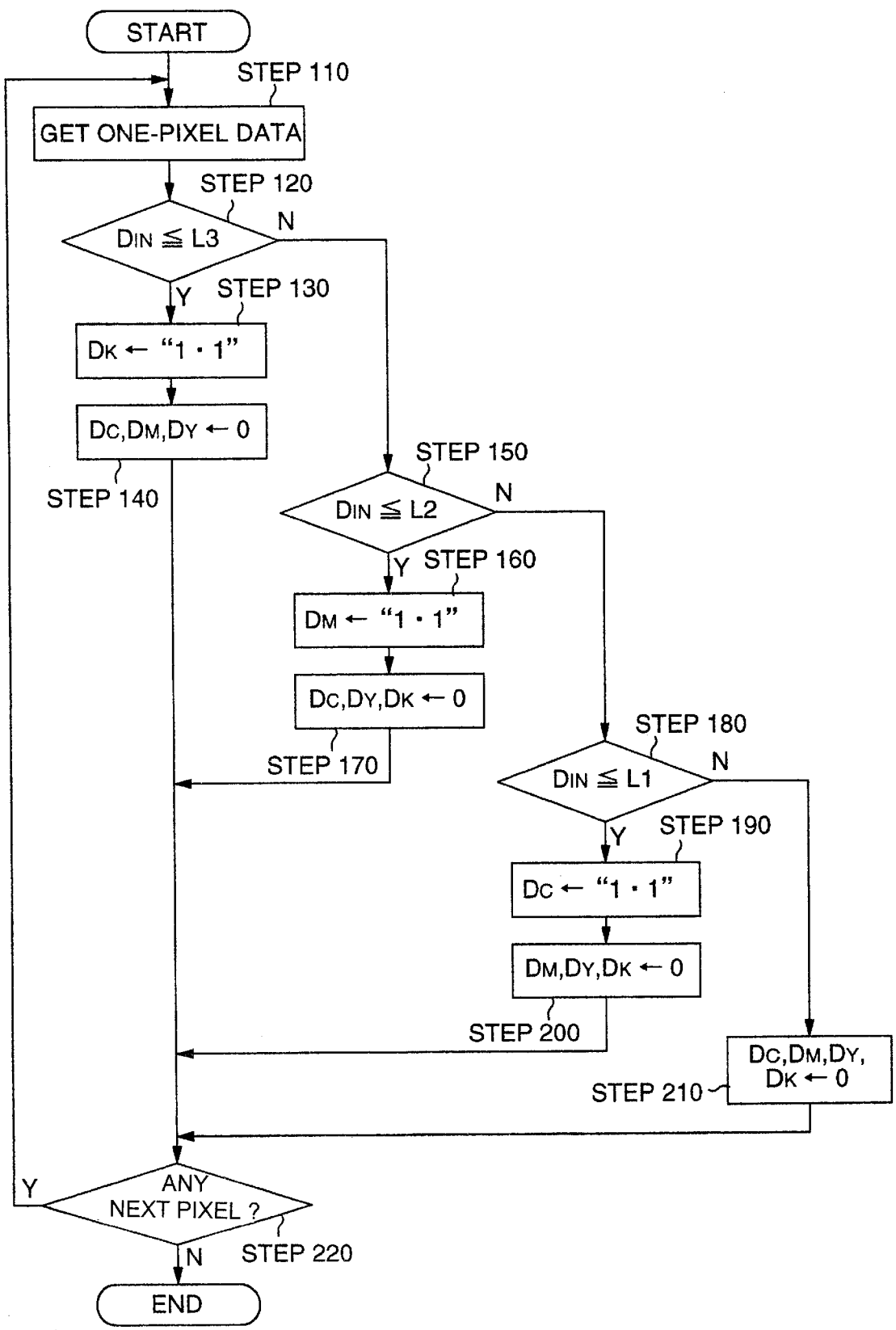
FIG. 6 is a flow chart of operation of the blackboard device of the second embodiment.

Operation of the second converter 23 will then be described with reference to a flow chart of FIG. 6. First, the second converter 23 gets a B component signal $D_{IN}$ output from the A/D converter 21 at step 110, and compares the signal $D_{IN}$ with L3 at step 120. If the value of $D_{IN}$ is not larger than L3, the second converter 23 determines that the pixel is black, sets the K component $D_K$ of the pixel at "1·1" (2-bit data) at step 130, and sets other C, M and Y components $D_C$, $D_M$, $D_Y$ at "0·0" at step 140. When $D_{IN}$ is larger than L3, the second converter 23 compares $D_{IN}$ with L2 at step 150. If $D_{IN}$ is not larger than L2, the second converter 23 determines that the pixel is red, sets the M component $D_M$ of the pixel at "1·1" at step 160 and sets the C, Y and K components $D_C$, $D_Y$ and $D_K$ at "0·0" at step 170. If $D_{IN}$ is larger than L2, the second converter 23 compares $D_{IN}$ with L1. If $D_{IN}$ is not larger than L1, the second converter 23 determines that the pixel is blue, sets the C component $D_C$ of the pixel at "1·1" at step 190 and sets the C, Y and K components $D_C$, $D_Y$ and $D_K$ at "0·0" at step 200. If $D_{IN}$ is larger than L1, the second converter 23 determines that nothing is written in that pixel and at step 210, sets all the components at "0·0". The above processing is repeated on all the data output from the A/D converter 21 (step 220).

As described above, according to the present invention, the electronic blackboard device has the function of reading color data and printing the data, and selectively setting a monochromatic printing mode in which data is written with the marker on the writing surface and a multi-color multi-gradation printing mode in which, for example, a chart is posted to the writing surface. Thus, color copy where waste of toners is reduced is obtained.

A third embodiment of the electronic blackboard will be described next. The main feature of the third embodiment is that an area on the writing surface where data is written with a marker is discriminated from an area where, for example, a chart is posted. In the former area, a mode becomes effective where each of the pixels is printed in a monochromatic color closest in color to the pixel or two kinds of toners or inks by the color printer 25. In the latter area, a multi-gradation printing mode becomes effective.

Figure 7:
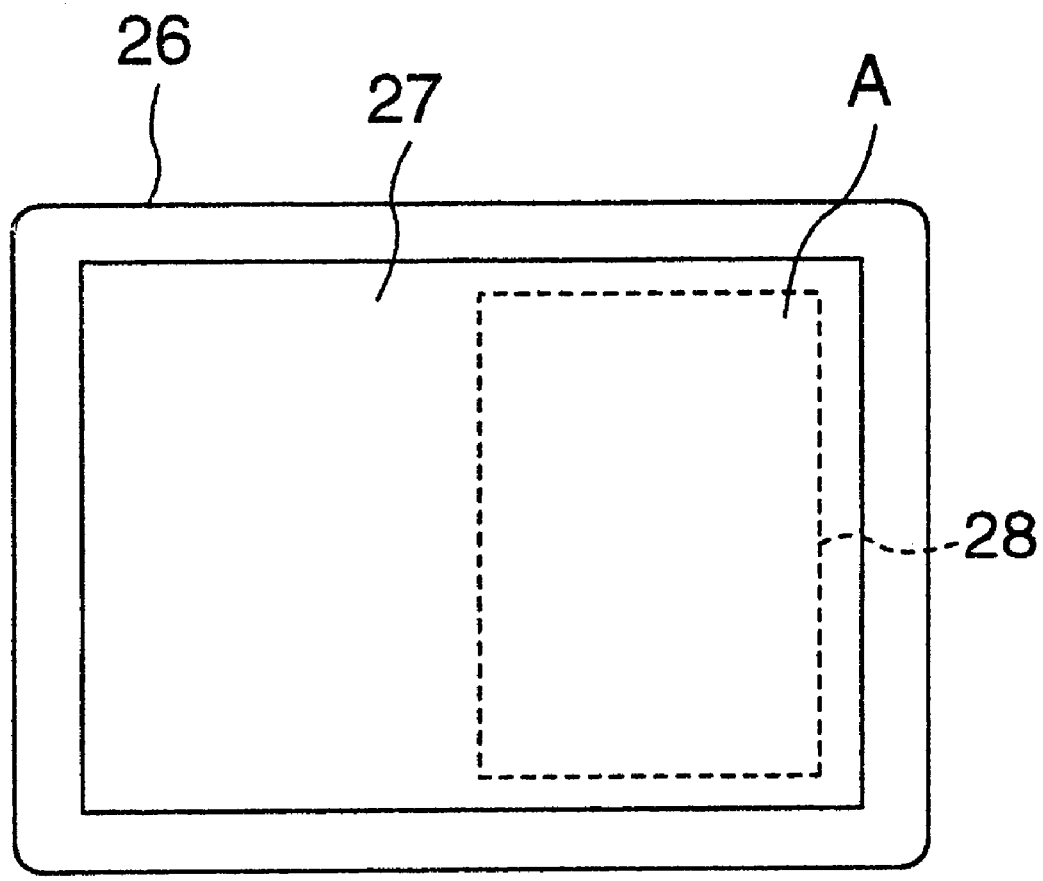
FIG. 7 is a front view of a writing sheet of the blackboard device of a third embodiment.

FIG. 7 illustrates the housing of the blackboard device of the third embodiment. Reference numeral 26 denotes a housing of the blackboard device; 27 a writing sheet having a writing surface in an opening of the housing 26 where information is written erasably with an aqueous marker.

As shown in FIG. 7, a chart posted area A is set which is specified by a broken line 28. Since data in the area A is processed as gradationed, its color is faithfully reproduced even when, for example, a chart is posted on the area A.

The third embodiment has the composition similar to that of FIG. 3, where reference numeral 12 denotes an image sensor that is mentioned above; 13 an A/D converter which converts analog RGB signals output from the image sensor 12 to corresponding 8-bit RGB digital signals; 14 an image processor which output RGB color signals for each pixel on the basis of the output from A/D converter 13; 15 a converter which converts trichromatic RGB signals output from the image processor 14 to CMYK signals; 16 a printer control circuit which causes the color printer 17 to print, for example, in an ink jet system on the basis of the outputs from the converter 15. The color printer 17 records the appropriate data in each of the CMYK colors of four gradations. In this case, the data is printed in a total of 64 colors based on a combination of four colors CMYK and four gradations. Thus, when the output signals (C, M, Y, K) are (0, 0, 0, 4), the data is printed in black. When the output signals (C, M, Y, K) are (4, 0, 4, 0), the data is printed in green. When the output signals (C, M, Y, K) are (4, 4, 0, 0), the data is printed in blue.

The converter 15 determines the color of each pixel on the basis of the output signals from the image processor 14 and converts the RGB signals to CMYK signals processable in the color printer in accordance with the result of the determination of the pixel color. The printer control circuit 16 causes the color printer 17 to print the appropriate data on the basis of the CMYK signals output from the converter 15.

Figure 8:
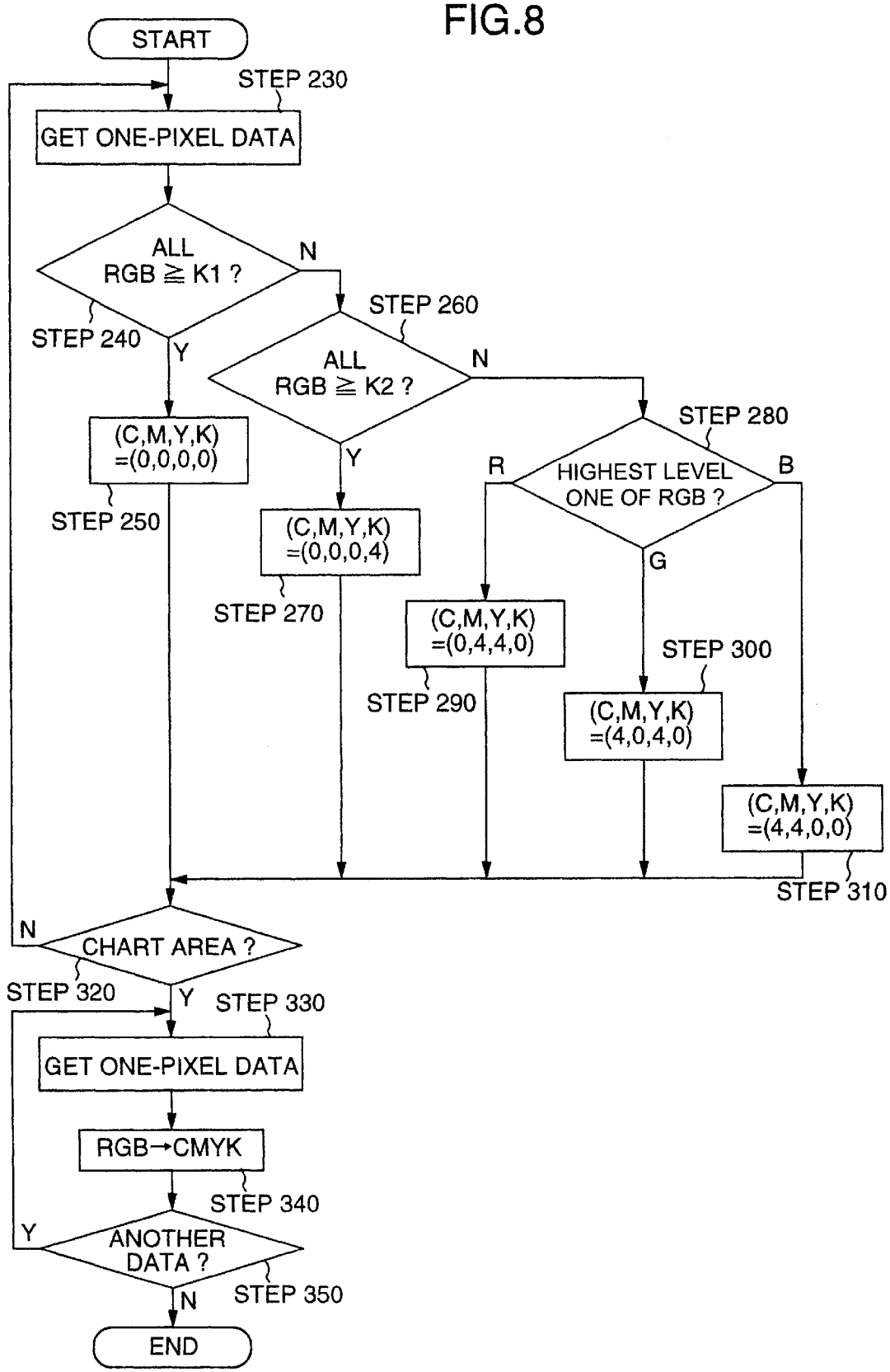
FIG. 8 is a flow chart of operation of a blackboard of the third embodiment of the present invention.

Processing performed by the converter 15 will now be described with reference to the flow chart of FIG. 8. First, at step 230, the converter 15 gets data for one pixel output from the image processor 14, and examines the levels of the respective RGB signals. If the levels of all the RGB signal levels are not less than a predetermined value (for example, of 150 when each of the output signals from the image processor 14 has an 8-bit/256-gradation), the converter 15 determines that the pixel is white and provides output signals (C, M, Y, K)=(0, 0, 0, 0) to the printer control circuit 16 (steps 240–250).

If the levels of all the RGB signals are not larger than a predetermined value (for example, of 50 when each of the output signals from the image processor 14 has an 8-bit/256 gradation), the converter 15 determines that the pixel is black and provides output signals (C, M, Y, K)=(0, 0, 0, 4) to print black to the printer control circuit 16 (steps 260–270). When the pixel is neither white nor black, the converter 15 determines at step 280 which of red, blue and green the pixel is.

More specifically, the converter 15 compares the respective levels of the trichromatic RGB signals to detect a signal of the highest level. When the R signal has the highest level, the converter determines the pixel is red and provides output signals (C, M, Y, K)=(0, 4, 4, 0) to the printer control circuit 16. When the G signal has the highest level, the converter determines the pixel is green and provides output signals (C, M, Y, K)=(4, 0, 4, 0) to print green to the printer control circuit 16. When the B signal has the highest level, the converter determines the pixel is blue and provides output signals (C, M, Y, K)=(4, 4, 0, 0) to print blue to the printer control circuit 16.

The above processing is repeated up to a pixel present directly before the area A. As described above, since the area A is beforehand set on the writing sheet 27, the converter 15 counts the number of pixels which were subjected to the processing at steps 236–310. After a predetermined number of pixels is processed, the converter determines that the subsequent data are in the area A and then performs processing at steps 330–340.

The converter 15 gets data for one pixel output from the image processor 14 at step 330, converts the RGB data of 256 gradations to CMYK data of four gradations processable by the color printer 17 at step 340, and provides those data to the printer control circuit 16. The processing at step 330–340 is then repeated on all the data output from the image processor 14 and the color printer 17 reproduces the information in the area A in 64 colors.

As described above, in the third embodiment, color printing is performed by the electronic blackboard device. Information written, for example, with a marker, is printed uniformly in a predetermined color corresponding to the marker. A portion of the writing surface to which, for example, a chart is posted is reproduced faithfully in a multiple color.

What is claimed is:

1. An electronic blackboard device comprising:
   a writing surface on which information is to be written erasably with writing materials;
   a reader for reading the information written on the writing surface for each of color components of the information to provide read color data;
   discriminating means for discriminating said read color data to provide a discrimination output indicating to which one of a plurality of color categories said read color data belongs;
   converting means for converting said read color data into converted color data of one color of a plurality of color agents in accordance with said discrimination output; and
   printing means for outputting the information read by said reader in accordance with said converted color data onto a recording paper.

2. The electronic blackboard device according to claim 1, wherein the printing means includes a plurality of coloring agents having different colors.

3. The electronic blackboard device according to claim 1, wherein the printing means includes one of a set of toners having different colors and a set of inks having different colors.

4. An electronic blackboard device comprising:
   a writing surface on which information is to be written erasably with writing materials;
   a reader for reading the information written on the writing surface for each of color components of the information to provide read color data;
   discriminating means for discriminating said read color data to provide a discrimination output indicating to which one of a plurality of color categories said read color data belongs;
   converting means for converting said read color data into converted color data of one color of a plurality of color agents in accordance with said discrimination output wherein each pixel of said color data has associated therewith one color of said plurality of color agents; and
   printing means for outputting the information read by said reader in accordance with said converted color data onto a recording paper.

5. The electronic blackboard device according to claim 4, wherein the printing means includes a plurality of coloring agents having different colors.

6. The electronic blackboard device according to claim 4, wherein the printing means includes one of a set of toners having different colors and a set of inks having different colors.

7. An electronic blackboard device comprising:

a writing surface on which information is to be written erasably with writing materials;

a reader for reading the information written on the writing surface for each of color components of the information to provide read color data;

discriminating means for discriminating said read color data to provide a discrimination output indicating to which one of a plurality of color categories said read color data belongs;

converting means for converting said read color data into converted color data of two colors of a plurality of color agents in accordance with said discrimination output, wherein each pixel of said color data has associated therewith two colors of said plurality of color agents; and printing means for outputting the information read by said reader in accordance with said converted color data onto a recording paper.

8. The electronic blackboard device according to claim 7, wherein the printing means includes a plurality of coloring agents having different colors.

9. The electronic blackboard device according to claim 7, wherein the printing means includes one of a set of toners having different colors and a set of inks having different colors.

* * * * *